(12) United States Patent
Devine

(10) Patent No.: US 7,988,218 B1
(45) Date of Patent: Aug. 2, 2011

(54) COMPONENT CAMPER SHELL KIT WITH OPTIONAL CARGO RACK

(76) Inventor: Robert J. Devine, Kirkland, WA (US)

( * ) Notice: Subject to any disclaimer, the term of this patent is extended or adjusted under 35 U.S.C. 154(b) by 160 days.

(21) Appl. No.: 12/460,283

(22) Filed: Jul. 16, 2009

Related U.S. Application Data

(60) Provisional application No. 61/081,318, filed on Jul. 16, 2008.

(51) Int. Cl.
B60P 7/02 (2006.01)

(52) U.S. Cl. .............................. 296/100.02; 296/100.01

(58) Field of Classification Search ............ 296/100.01, 296/100.02, 101, 100.17, 100.03, 100.04
See application file for complete search history.

(56) References Cited

U.S. PATENT DOCUMENTS

| | | | |
|---|---|---|---|
| 3,989,148 A | 11/1976 | Donohue | |
| 4,585,264 A | 4/1986 | Miller | |
| 5,056,855 A | 10/1991 | Moravsky | |
| 5,316,357 A | 5/1994 | Shroeder | |
| 6,428,079 B1 | 8/2002 | Van Dyke | |
| 6,435,594 B1 | 8/2002 | Ekonen et al. | |
| 6,663,160 B2 | 12/2003 | Yarbrough et al. | |
| 7,243,965 B2 | 7/2007 | King et al. | |
| 7,246,839 B1 | 7/2007 | Nyberg | |
| 7,261,362 B1 | 8/2007 | Mendez | |
| 2003/0168879 A1* | 9/2003 | Grudek | 296/100.15 |
| 2004/0007900 A1* | 1/2004 | Block | 296/100.02 |
| 2004/0207231 A1* | 10/2004 | Hoffmann | 296/100.17 |
| 2008/0067830 A1* | 3/2008 | Frankham | 296/100.02 |

* cited by examiner

Primary Examiner — Lori Lyjak
(74) Attorney, Agent, or Firm — Montgomery Patent and Design; Robert C. Montgomery

(57) ABSTRACT

A camper shell kit including a plurality of removable panels that are individually mountable onto a frame is herein disclosed. The frame serves as the skeleton for the shell and also provides a base for an optional top-mounted rack. Each panel may be mounted individually to the frame to create customized camper shell configurations. Panel insertion may not require the use of tools. Panels can be interchanged with others made of different materials for specific tasks. The frame may be integrated to match the shape of the truck and provide flush mounting for shell panels offering a smooth, integrated appearance with the vehicle. The frame mounts directly onto standard truck bed mount points which may provide maximum strength and load-bearing capacity. The frame permits the panels to be locked into place providing security for the payload against theft.

19 Claims, 17 Drawing Sheets

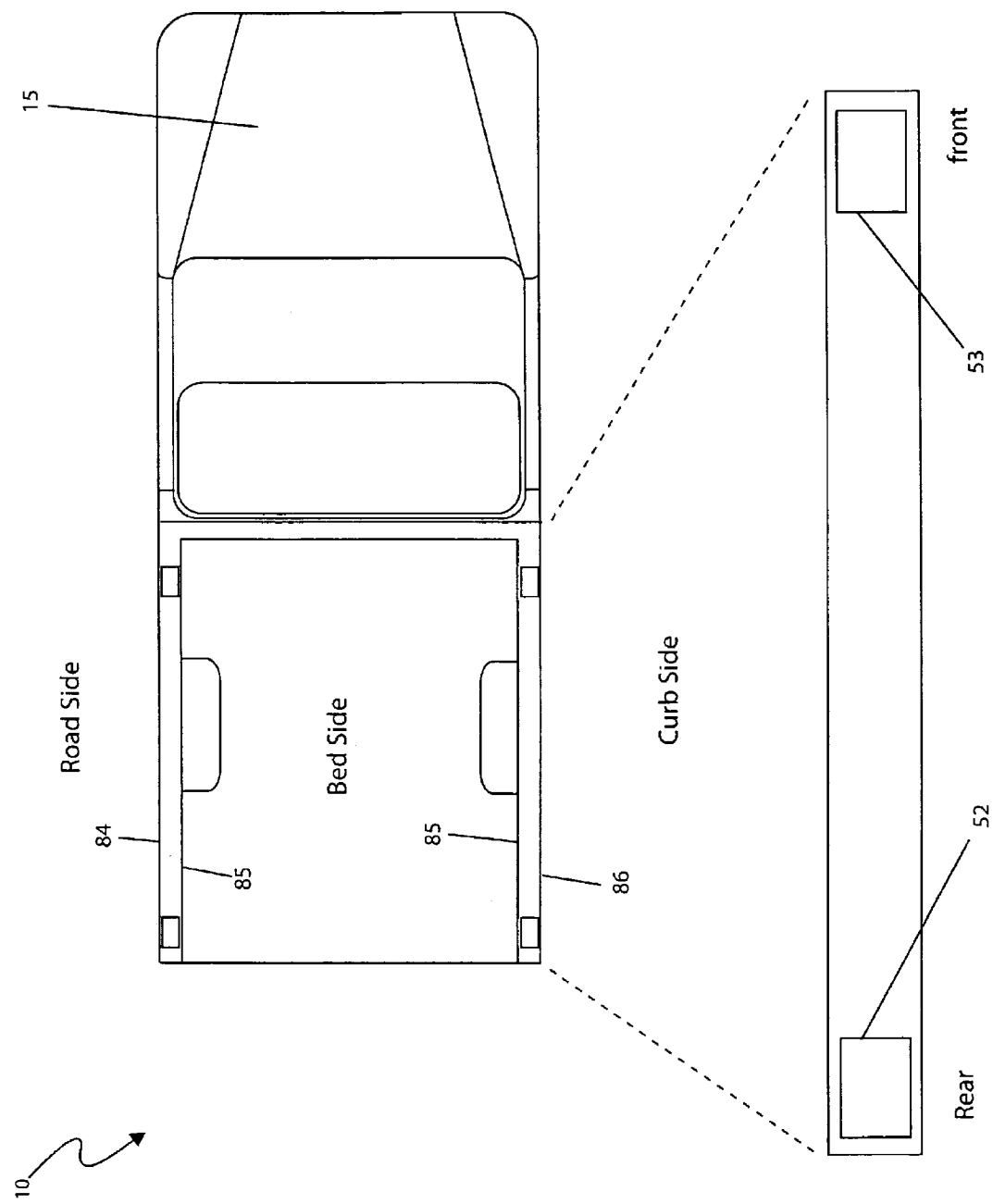

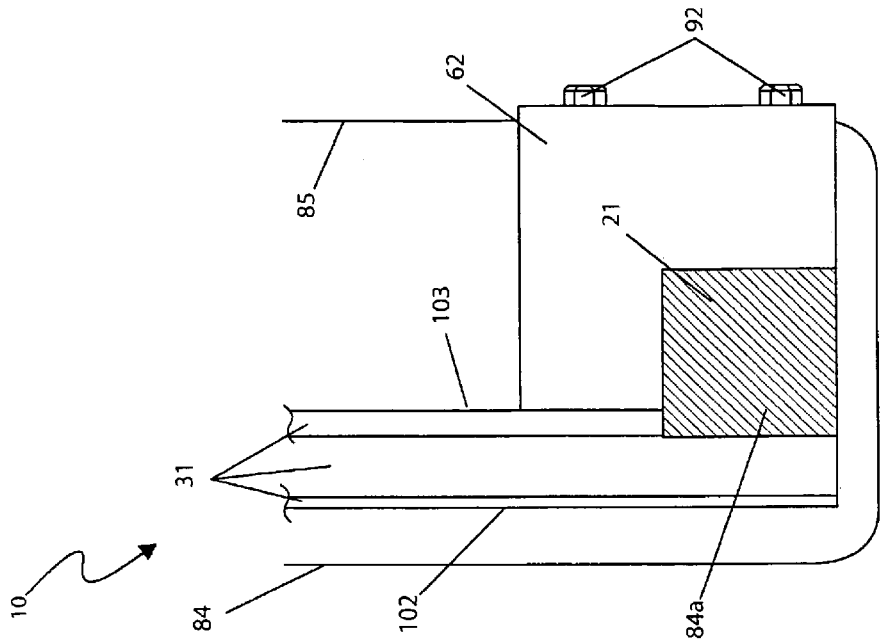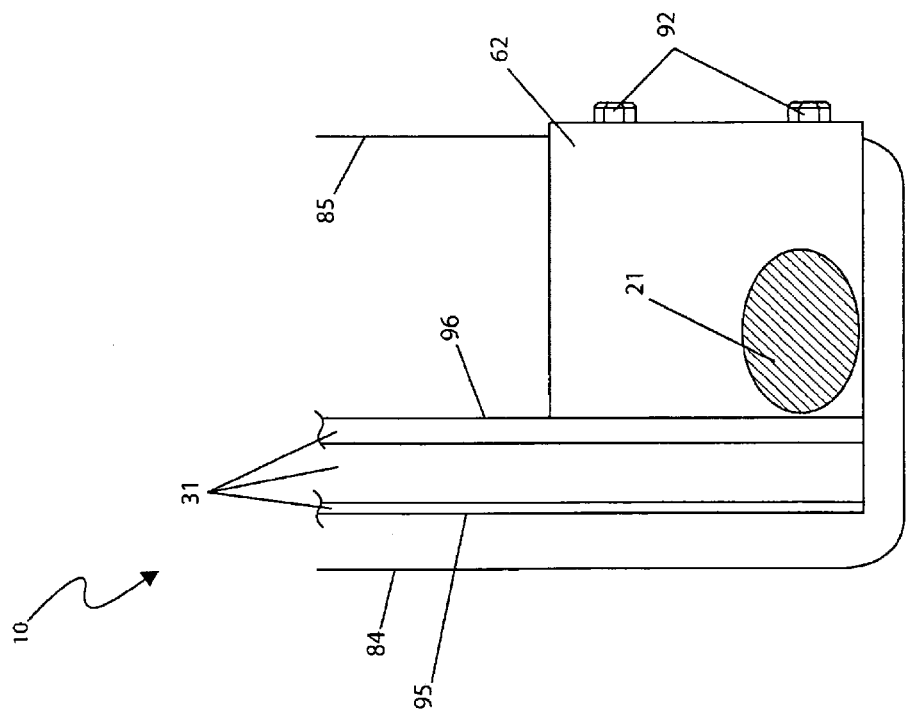

COMPONENT CAMPER SHELL KIT WITH OPTIONAL CARGO RACK

RELATED APPLICATIONS

The present invention was first described in and claims the benefit of U.S. Provisional Application No. 61/081,318 filed Jul. 16, 2008, the entire disclosures of which are incorporated herein by reference.

FIELD OF THE INVENTION

The present invention relates generally to covers for the bed of a pickup truck, and more particularly, to a modular component camper shell kit having an optional cargo rack.

BACKGROUND OF THE INVENTION

Many people have a special fondness for the pickup truck, as it provides a unique combination of function, versatility, comfort, and style. The pickup truck enables a user to transport articles having a wide variety of sizes and weights. One disadvantage associated with transporting items in the load carrying portion of the pickup truck is that the items are vulnerable to damage, theft, or loss due to the open and unsecured nature of the pickup truck bed. One solution to this problem is to utilize hard top camper shells or tonneau bed covers, which mounts to the upper rails of the pickup bed. While there are various types of shells available, these shells typically cover the entire cargo area and are only large enough to cover and protect items that would fit within the confines of the pickup truck bed outer perimeter. If larger items need to be transported the camper shell must be removed, which leads to difficulty in storage and the effort of reattaching after transportation of the oversized items. Additionally, camper shells and bed covers do not provide any means to support additional cargo due to their typically flimsy construction and lightweight materials.

Various attempts have been made to overcome these restrictions and provide oversized shells or covers having pneumatic cylinders that enable portions of the cover to expand and retract as needed. While these attempts attempt to eliminate the need to remove the cover for some applications, they still restrict the hauling versatility provided by an open truck bed. Examples of such attempts can be seen through reference to several U.S. Patents, including: U.S. Pat. No. 5,056,855; U.S. Pat. No. 7,261,362; U.S. Pat. No. 7,243,965; U.S. Pat. No. 7,246,839; and U.S. Pat. No. 6,435,594.

U.S. Pat. No. 5,056,855, issued in the name of Moraysky, describes a vehicle bed cover assembly having a frame member and a series of frame panels. U.S. Pat. No. 7,261,362, issued in the name of Mendez, describes a camper shell for a vehicle having foldable sections which can expand and retract upon a base channel unit. U.S. Pat. No. 7,243,965, issued in the name of King et al., describes a convertible camper shell and hard tonneau which can be raised and lowered between a camper shell and a bed cover.

While these devices fulfill their respective, particular objectives, each of these references suffers from one or more of the aforementioned disadvantages or deficiencies. Accordingly, there exists a need for a means to cover the cargo area of a pickup truck without the disadvantages as described above. The development of the present invention substantially departs from the conventional solutions and in doing so fulfills this need.

SUMMARY OF THE INVENTION

In view of the foregoing disadvantages inherent in the prior art, it has been observed that there is need for a component camper shell system for use on a bed portion of a truck. Such a component camper shell system preferably includes a frame adapted to be mounted to the truck bed portion, a forward panel, a pair of side panels, and a top panel independently and removably affixed to the frame. The component camper shell system further includes a rear window assembly pivotally mounted to the frame and oppositely spaced from the forward panel.

Notably, the frame includes a plurality of tracks contiguously formed along a perimeter thereof, and a plurality of moveable brackets connected to the tracks. Each of the forward side and top panels linearly slide along the tracks respectively and are secured to the frame by the moveable brackets respectively.

In one embodiment, a cargo rack system may be removably attached to a roof of the frame.

In one embodiment, the frame further includes a plurality of mounting, plates adapted to be positioned along a wall of the truck bed portion; and a plurality of pegs adapted to be positioned on the wall of the truck bed portion. Such pegs are attached to the mounting plates and the wall of the truck bed portion for stabilizing the frame above the truck bed portion.

In one embodiment, a first bottom one of the tracks preferably includes an outer bracket edge and an inner bracket edge adapted to be placed flush against a road side edge of the frame. The first bottom track and a fixed lower one of the tracks may have "U"-shaped channels and are each mounted externally to the frame.

Notably, each of the moveable brackets is pivotally attached to a corresponding one of the tracks and thereby permits the panels to linearly slide along the tracks when the moveable brackets are biased to an open position respectively.

In one embodiment, the rear window assembly preferably includes a window, first and second side brackets, and bottom and top brackets. Each of the first, second, bottom and top brackets are connected to a corresponding edge of the window respectively. The top bracket laterally slides into one of the tracks wherein the one track remains attached to the frame as the rear window assembly is pivoted upward and into an open position. In this manner, the rear window shields a rear side of the frame from ambient weather.

In one embodiment, the top bracket is provided with an interlocking piece received by one track. The top bracket further includes a hinge attached to the window and thereby permits the window to pivot exterior of the frame when biased between open and closed positions. Each of the movable brackets are hingedly affixed to fixed ones of the tracks such that the forward, side and top panels are freely inserted along the fixed tracks when the movable brackets are biased to an open position respectively.

In one embodiment, the present invention may further include a lock coupled to at least one of the movable brackets and a corresponding one of the mounting plates to prevent a corresponding one of the panels from prematurely sliding out from the fixed tracks. Further, the forward panel may have a boot adapted to create a weather proof seal between a cab portion of the truck and the camper shell.

In one embodiment, the present invention may further include a plurality of rollers located along an edge of the panels respectively for aiding in linear displacement of the panels along the tracks respectively.

In one embodiment, the present invention may further include a plurality of interlocking connector portions formed at abutting ends of the top panel and a conjoining one of the panels respectively. The tracks may be inverted and externally mounted to the frame and configured in such a manner that the top and conjoining panels fully wrap around the tracks when the interlocking connector portions are mated together.

In one embodiment, the present invention may further include a method of installing and utilizing acquiring a component camper shell system. Such a component camper shell system preferably includes a frame adapted to be mounted to the truck bed portion; a forward panel, a pair of side panels, and a top panel independently and removably affixed to the frame; and a rear window assembly pivotally mounted to the frame and oppositely spaced from the forward panel. The frame preferably includes a plurality of tracks contiguously formed along a perimeter thereof, a plurality of moveable brackets connected to the tracks, and a cargo rack system removably attached to a roof of the frame. Each of the forward side and top panels linearly slide along the tracks respectively and are secured to the frame by the moveable brackets respectively.

The method preferably includes the steps of form-fitting the component camper shell system to the truck so the component camper shell system does not extend beyond outer dimensions of the truck; installing the frame to corresponding mount points on the truck; installing the panels to create a shell portion of the component camper shell system by sliding each of the panels a corresponding track and thereafter positioning the moveable brackets downwardly in a locked position; and installing the cargo rack as desired by the user.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5 is a top view of the component camper shell with optional cargo rack 10 depicting a front mount point 53 and a rear mount point 52 thereon each side, according to a preferred embodiment of the present invention;

FIG. 9 is a top view of an oval stock frame 21, according to a preferred embodiment of the present invention;

FIG. 10 is a top view of a square stock frame 21, according to a preferred embodiment of the present invention;

Figure 1:
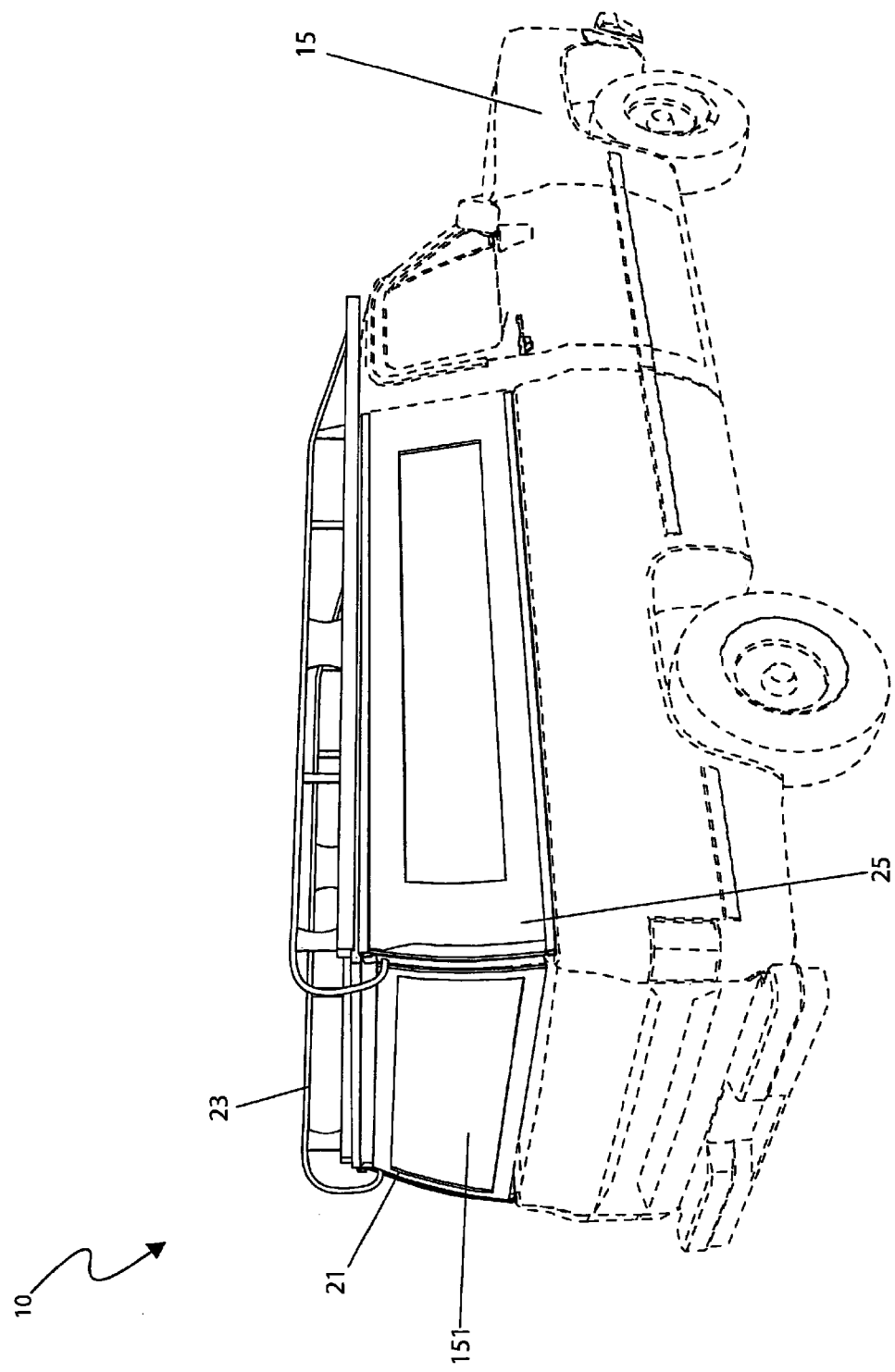
FIG. 1 is an environmental view of a component camper shell with optional cargo rack 10, according to a preferred embodiment of the present invention.

DESCRIPTIVE KEY 10 component camper shell with optional cargo rack
15 truck
21 frame
23 cargo rack
24 forward panel
25 side panel
26 fixed bracket
27 rear movable bracket
28 front movable bracket
31 first bottom track
31a fixed lower track
32 front bottom track
33 top panel
34 front panel top track
35 side panel top track
52 rear mount point
53 front mount point
62 mounting hardware
63 rear truck edge
64 plate
65 peg
83 predrilled aperture
84 roadside mount point
85 truck bed inner side
86 curbside mount point
92 fasteners
95 outer bracket edge
96 inner bracket edge
111 exterior mount
121 interior mount
131 internal mount
141 flush mount
151 rear window assembly
152 track
153 first side bracket
153a second side bracket 154 bottom bracket
155 rubber strip
156 hydraulic piston
157 frame mount point
159 first piston mount point
159a second piston mount point
161 top bracket
164 rear window
165 top bracket hinge
166 interlocking piece
172 fixed track
173 hinge
183 side panel perimeter
184 lock
185 bolt
192 optional boot
201 weather-stripping
202 roller
231 alternate track
232 shell panel
233 alternate top panel
237 interlocking connector

DETAILED DESCRIPTION OF THE PREFERRED EMBODIMENT

Figure 20:
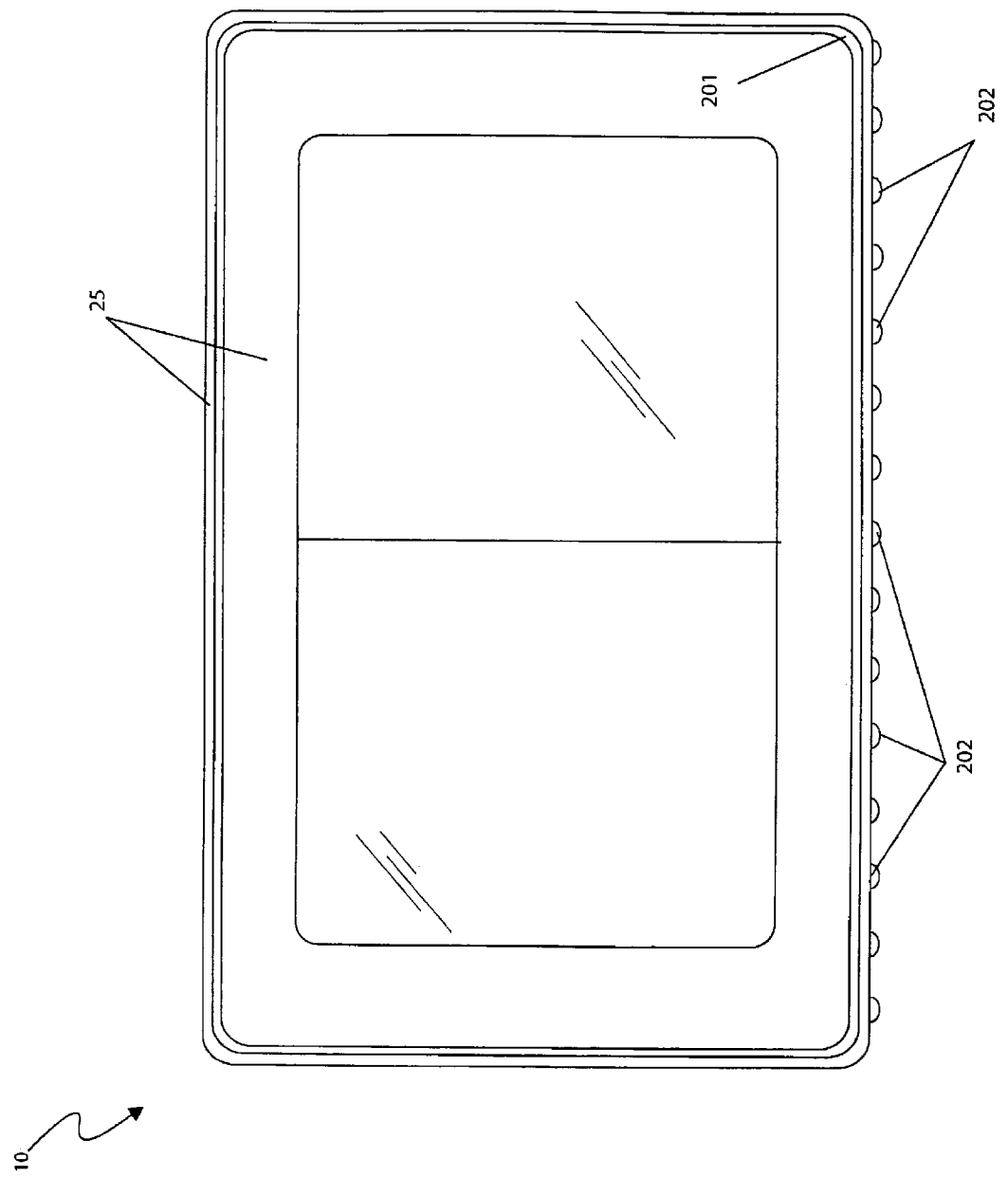
FIG. 20 is a side view of the side panel 25 depicting placement of weather-stripping 201, according to a preferred embodiment of the present invention.
Figure 21:
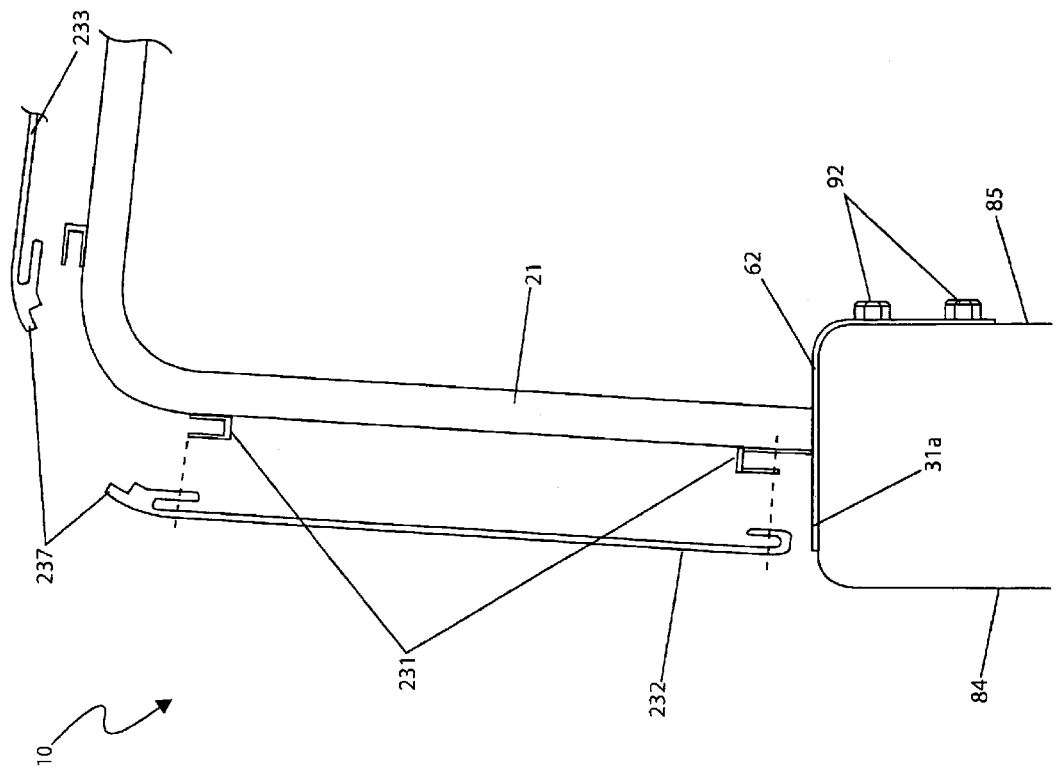
FIG. 21 is a rear view of an external, inverse bracket mount configuration, according to an alternate embodiment of the present invention.

The best mode for carrying out the invention is presented in terms of its preferred embodiment, herein depicted within FIGS. 1 through 20, with an alternate embodiment within FIG. 21. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a component camper shell with optional cargo rack (herein described as the "system") 10, which provides the capability to utilize both a removably attachable camper shell and optional cargo rack 23 simultaneously thereon a bed portion of a truck 15. Said system 10 comprises a frame 21, a cargo rack 23, a forward panel 24, a side panel 25, a top panel 33, a rear window assembly 151, and various integral components. Said system 10 integrates a frame 21 and an optional cargo rack 23 into a single componentized system. Said system 10 utilizes the frame 21 as a skeleton for the shell and the base of the cargo rack 23, thereby eliminating the need to optimize one (1) at the expense of the other. Said system 10 allows the frame 21 to be well-fitted to a truck 15 and still offers the ability to use the interior portion of the camper shell and cargo rack 23.

Referring now to FIG. 1, an environmental view of the system 10, according to the preferred embodiment of the present invention, is disclosed. The system 10 comprises a forward panel 24, a pair of side panels 25, and a top panel 33 which are each independent components. Said system 10 also comprises a rear window assembly 151 mounted to a frame 21. When the system 10 is in an assembled state the panels 24, 25, 33, rear window assembly 151, and frame 21 forms a fully-enclosed camper shell. When the system 10 is in a disassembled state the panels 24, 25, 33 can be stored easily, for example they can be stood on edge and stacked against a wall in a similar manner as sheets of plywood or drywall, minimizing the amount of storage space required. The panels 24, 25, 33 are fabricated from suitable material such as, but not limited to the following materials: fiberglass, wood, composites, carbon fiber, steel, aluminum or plastics (e.g. Polycarbonate or others). A total of five (5) sides can be enclosed by panels, and together therewith the bed of the truck 15 as the sixth (6) side the full rectangular volume is enclosed. Each panel 24, 25, 33 can enclose one (1) or more sides depending on the configuration. For example, in a five (5) panel configuration each panel 24, 25, 33 is relatively flat and the components include one (1) top, two (2) sides, one (1) front and one (1) rear. FIG. 1 illustrates the frame 21 installed on a truck 15 with the side panel 25 and rear window assembly 151 installed. The optional roof rack 23 is also depicted.

Figure 2:
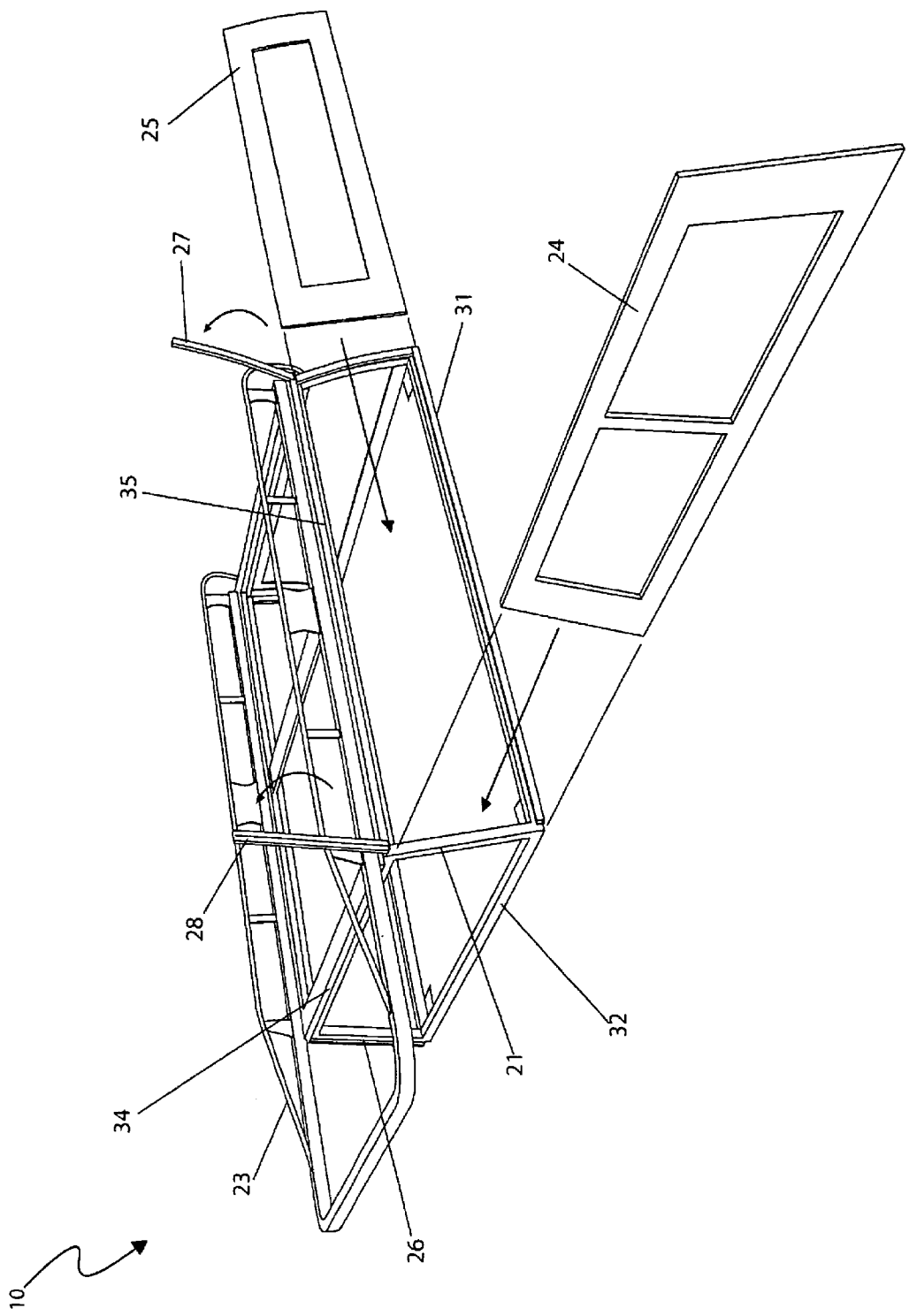
FIG. 2 is a partial isometric view illustrating an exploded side panel 25 and an exploded front panel 24 and a frame 21, according to a preferred embodiment of the present invention.

Referring now to FIG. 2, partial isometric view illustrating an exploded side panel 25 and an exploded front panel 24 and a frame 21, according to the preferred embodiment of the present invention, is disclosed. FIG. 2 depicts the frame 21 without the truck 15 and also depicts two (2) shell components (the forward panel 24 and the side panel 25) for illustration purposes only. The frame 21 serves as the skeletal structure for the component panels 24, 25, 33 and rear window assembly 151. Said frame 21 can be installed on the truck 15 and utilized with or without the camper shell components. Said frame 21 is fabricated from suitable structural materials such as, but not limited to the following materials: steel, aluminum, wood, composites, carbon fiber, or titanium. Said frame 21 also serves as a base platform for optional top-mounted cargo rack 23; therefore, said frame 21 can be utilized for the sole purpose of supporting the panels 24, 25, 33, or can be extended for carrying cargo thereon the cargo rack 23. Said frame 21 is full strength similar to conventional cargo carrying racks and is mounted directly onto the truck 15 via a rear mount point 52 and front mount point 53 (discussed below) for maximum strength and cargo carrying capacity. The panels 24, 25, 33 are inserted into the frame 21 along the direction shown by the arrows.

The system 10 comprises a pair of rear moveable brackets 27 and a pair of front movable brackets 28 in which one (1) of each are shown in the open position. The panels 24, 25, 33 slide into place along a first bottom track 31, a front bottom track 32, a top track 34, and a side panel top track 35. A stationary or fixed "end cap" bracket 26 is also shown. The front panel 24 will slide along the top and bottom tracks 32, 34 until it reaches this fixed bracket 26. After the panel 24, 25, 33 is fully inserted, its front moveable bracket 28 or rear movable bracket 27 can be hinged downwardly in a closed position. Each movable bracket 27, 28 may be pivotally mounted to the frame 21 by a pivot pin in a conventional hinging fashion. In this manner, each movable bracket 27, 28 may be swung into an open position from a closed position (depicted in FIG. 3), and vise versa.

The panel 24, 25, 33 components of the camper shell may be constructed from a molded, lightweight material such as fiberglass or plastic/composite material. Each panel is formed to be assembled with the frame 21. Both the panels and the frame 21 may be configured for a given truck 15 to give the maximum aesthetic value. Panels 24, 25, 33 can be color matched to the vehicle or given any other color via processes known in the art. Camper shell manufacturers are skilled in the art of molding entire one-piece shells.

Figure 3:
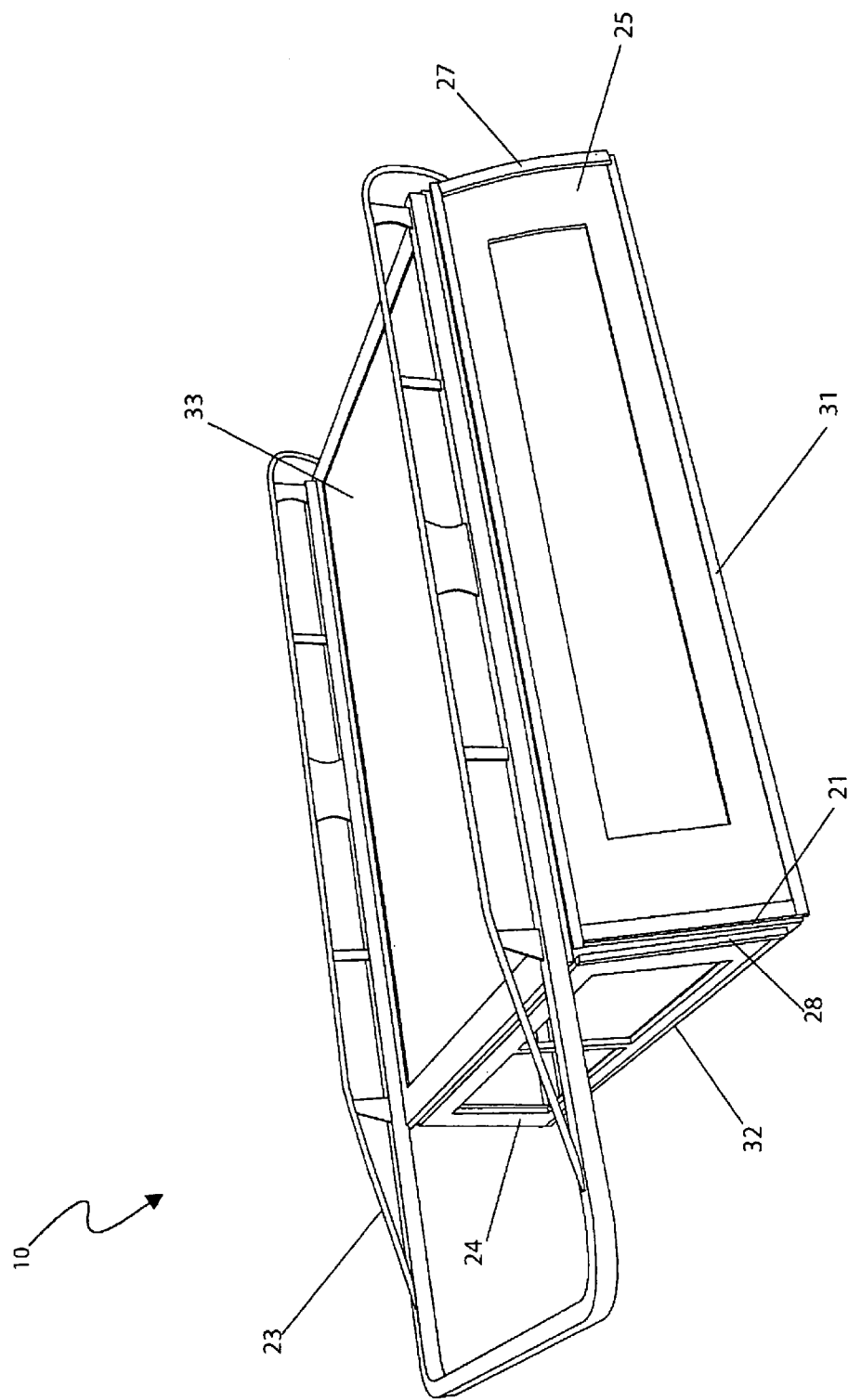
FIG. 3 is a partial isometric view of the frame 21 depicting an installed side panel 25, a front panel 24 and a top panel 33, according to a preferred embodiment of the present invention.

Referring now to FIG. 3, a partial isometric view of the frame 21 depicting an installed side panel 25, a front panel 24 and a top panel 33, according to the preferred embodiment of the present invention, is disclosed. FIG. 3 shows the frame 21 with three (3) panels 24, 25, 33 installed and the optional roof rack 23 is also depicted. The bottom-most track pieces 31, 32 that run along the entire side walls thereon the bed portion of the truck 15 comprise continuous (straight) bottom edges that can be made to seal thereto said bed portion of the truck 15. A plurality of conventional weather-stripping 201 may be applied to the bottom edge of these tracks 31, 32 for this purpose. It is important that this seal remain unbroken for it to remain weatherproof.

The optional cargo rack 23 may include any conventional vehicle top-rack known in the art such as, but not limited to: top racks designed to transport bicycles, canoes, Kayaks, surf boards, skis, snow boards, boxes, cargo containers, or the like. Further, the cargo rack 23 may include relatively simple racks to which items and materials may be tied or otherwise fastened thereon said cargo rack 23. Because the cargo rack 23 may be utilized to transport heavy items and/or materials the frame 21 may be constructed to support the weight of the cargo rack 23 and the items and/or materials transported thereby. Further, the frame 21 may be configured to provide support to the loaded cargo rack 23 while the vehicle is moving. The cargo rack 23 may also be integrally formed with the frame 21 therein the conventional welding processes or constructed separate from the frame 21 and fastened to the frame 21 in any manner known in the art, including welds, rivets, bolts, screws, adhesives, and the like. In particular embodiments, the cargo rack 23 is removably fastened to the frame 21 and the user may fasten the cargo rack 23 to the frame 21 for use and when the cargo rack 23 is not longer needed, said user may disassemble the cargo rack 23 from the frame 21.

Figure 4:
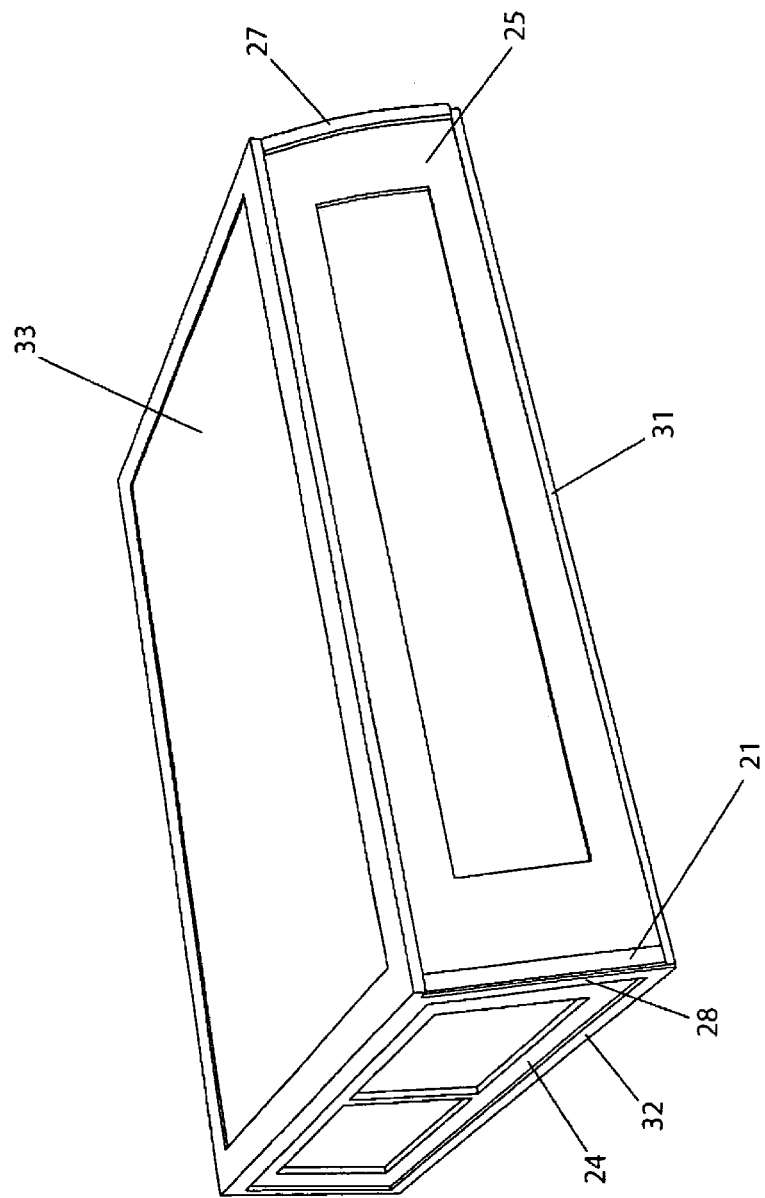
FIG. 4 is a partial isometric view of an alternate embodiment of the frame 21, according to a preferred embodiment of the present invention.

Referring now to FIG. 4, a partial isometric view of an alternate embodiment of the frame 21, according to the preferred embodiment of the present invention, is disclosed. FIG. 4 shows the frame 21 without the optional cargo rack 23. In this figure, the same three (3) panels 24, 25, 33 are installed in the frame 21, and the moveable brackets 27, 28 are in the closed position. This configuration uses the frame 21 as a skeleton for the camper shell and does not include a cargo rack 23. The frame 21 can be constructed as a weldment of tubular steel in a manner similar to many conventional standalone cargo top-racks. When constructing the frame 21, space may be allotted for the brackets 27, 28 and top panel 33. Because the frame 21 may be constructed using techniques well known in the art, the process will not be described in detail herein. The frame 21 dimensions in the embodiment are made to match the profile of the target truck 15, including cab heights, cab rear window inclination angle, the angles of the sides of the cab, the truck bed wall angles, and the rear profile of said truck 15. Matching these dimensions will allow the lines of the shell to line up with those of the cab, as shown in FIG. 1.

Referring now to FIG. 5, a top view of the component camper shell with optional cargo rack 10 depicting a front mount point 53 and a rear mount point 52 thereon each side, according to the preferred embodiment of the present invention, is disclosed. FIG. 5 depicts a rear mount point 52 and a front mount point 53 of the original equipment manufacturer (OEM) which is provided thereon the walls of the bed portion of the truck 15. Each wall of the bed contains a mount point 52, 53 thereon a road side 84 and a curb side 86 of the truck 15. As is apparent to those of ordinary skill, the assignment of the labels "Road Side" and "Curb Side" is arbitrary and used merely for illustrative purposes. Each side contains a front mount point 53 and rear mount point 52, for a total of four (4) mount points. These mount points 52, 53 are utilized thereto secure the frame 21 to the truck 15, in addition to a plurality of mounting plates 64 and fasteners. The embodiment allows for the mounting plates 64 to extend downwards into the OEM mount points 52, 53 as shown below in FIGS. 6 through 8.

Figure 6:
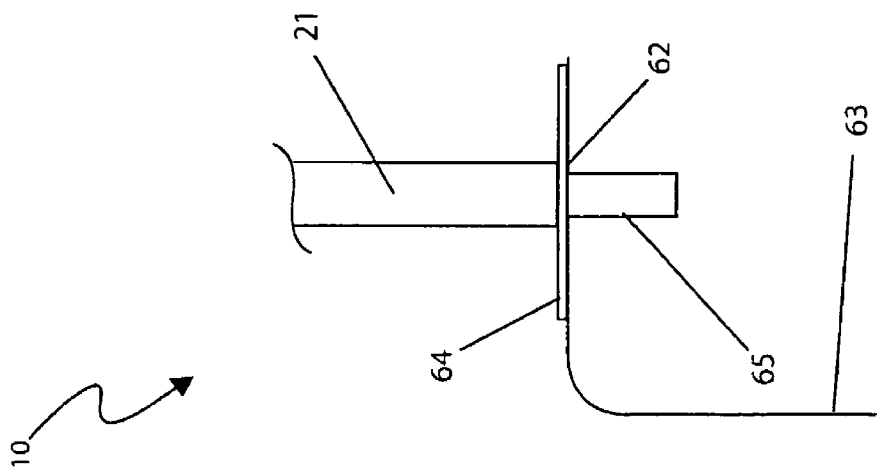
FIG. 6 is a side view of the frame 21 mounted to a rear truck edge 63 depicting an aligned state, according to a preferred embodiment of the present invention.

Referring now to FIG. 6, a side view of the frame 21 mounted to a rear truck edge 63 depicting an aligned state, according to the preferred embodiment of the present invention, is disclosed: The frame 21 is attached to the mounting hardware 62, which consists of a plurality of mounting plates 64 and a plurality of optional pegs 65. The frame 21 is aligned directly over the peg 65 in this example. The mounting plate 64 is a rectangular device utilized to attach the frame 21 thereto the truck 15 mounting points 52, 53. The peg 65 is cylindrical devices utilized thereto secure the mounting plate 64 thereto the truck 15. The mounting plate 64 and peg 65 are preferably fabricated from materials similar to that of the frame 21, yet other materials may be incorporated without limiting the functions of the system 10.

Figure 7:
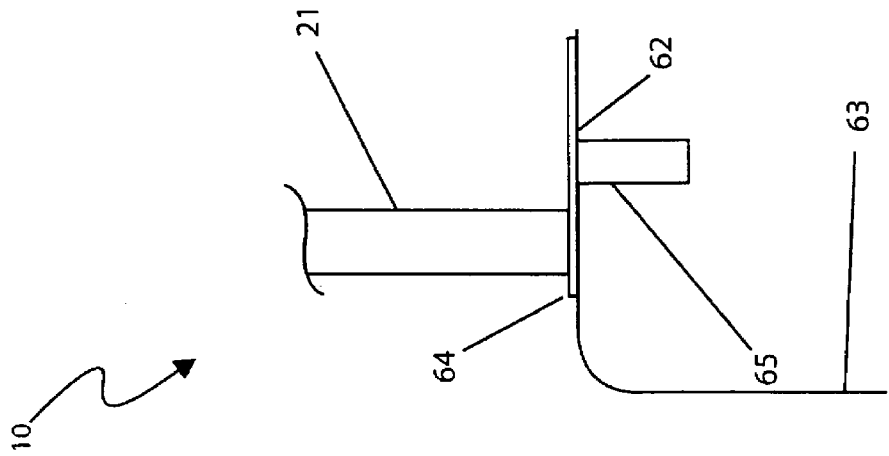
FIG. 7 is a side view of the frame 21 mounted to a rear truck edge 63 depicting an offset state, according to a preferred embodiment of the present invention.

Referring now to FIG. 7, a side view of the frame 21 mounted to a rear truck edge 63 depicting an offset state, according to the preferred embodiment of the present invention, is disclosed. FIG. 7 shows another method, whereby the frame 21 is offset from the peg 65. In the embodiment shown, the frame 21 is configured to correspond to the lines of the truck 15, so its mounting method is offset. Note that the frame 21 is still directly aligned over the wall of the bed portion of the truck 15.

Figure 8:
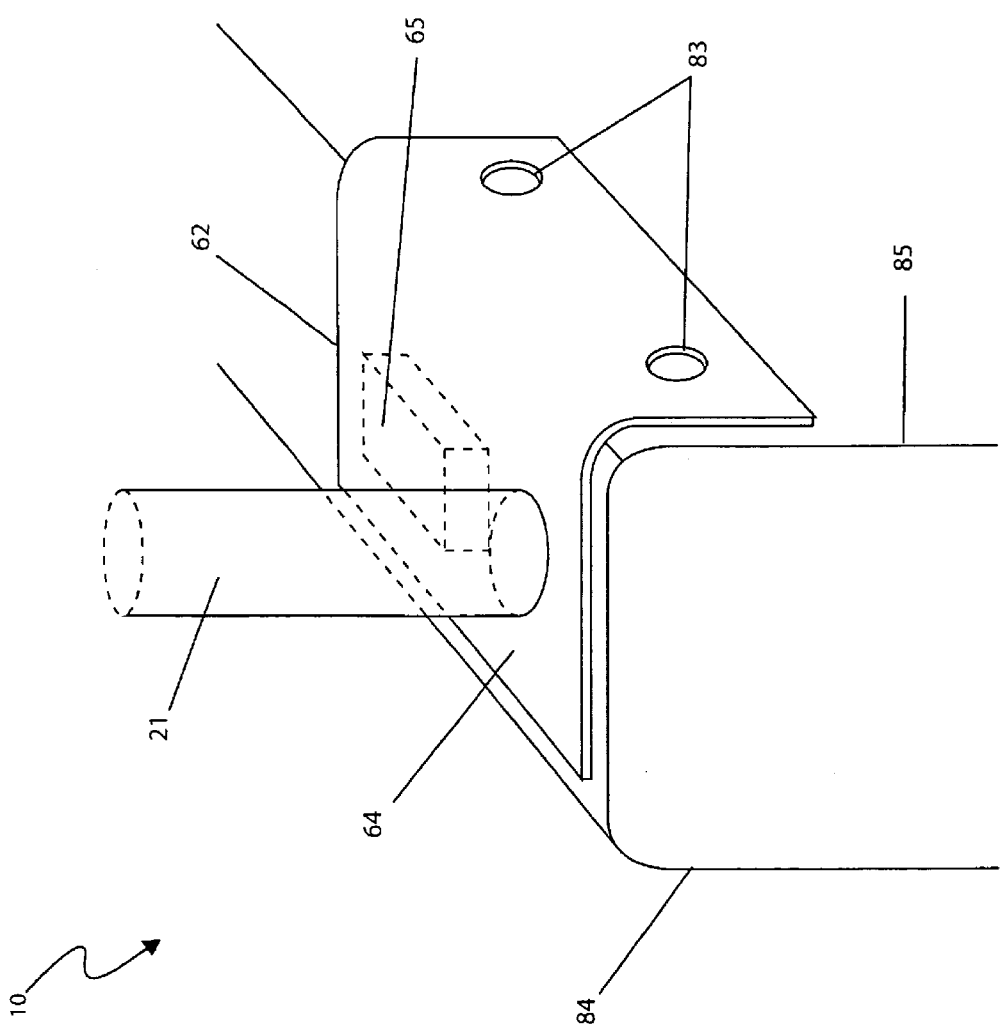
FIG. 8 is a partial isometric view of the frame 21 mounted to the truck 15 in an offset state therewith a mounting plate and pre-drilled apertures for fasteners, according to a preferred embodiment of the present invention.

Referring now to FIG. 8, a partial isometric view of the frame 21 mounted to the truck 15 in an offset state therewith a mounting plate 64 and pre-drilled apertures 83 for the insertion of fasteners 92, according to the preferred embodiment of the present invention, is disclosed. The mounting hardware 62 is mated with the OEM mount points 52, 53 and the frame 21 is offset rearwards thereto better align with the rear edge of the truck 15. Pre-drilled apertures 83 are provided for fasteners 92 such as screws, bolts or other means well-known in the art. Said pre-drilled apertures 83 are located thereon the inner side of the bed portion of the truck 15. Also note that since the frame 21 is offset rearwards from the OEM mount point 52, 53, the frame 21 remains over the bed wall itself, so it does not compromise overall strength and load-carrying capacity as do the over-the-shell methods (note that no lateral extension brackets are required, thus allowing the truck 15 to directly support the frame 21).

Referring now to FIG. 9, a top view of an oval stock frame 21 and FIG. 10, a top view of a square stock frame 21, according to the preferred embodiment of the present invention, are disclosed. FIGS. 9 and 10 depict top views of the left rear (road side 84) bed wall of the truck 15, each with a different frame 21 support profile. FIG. 9 illustrates the position of the frame 21 fabricated from oval stock. A pair of fasteners 92 is inserted through the corresponding pre-drilled apertures 83 aligned with the bed-side of the bed wall 85. The first bottom track 31 is aligned thereon the road-side 84. The outer bracket edge 95 and inner bracket edge 96 are placed flush against the road side edge 84 of the frame 21. Said edges 95, 96 when combined with a bottom edge form a completed bottom track 31 (denoted earlier in FIG. 2). In FIG. 10, the same configuration is shown except that the frame 21 is made from square stock. The bracket outer edge 95 is unchanged; however the inner edge 96 can now be integrated with the frame 21 along its road side edge 84.

Figure 11:
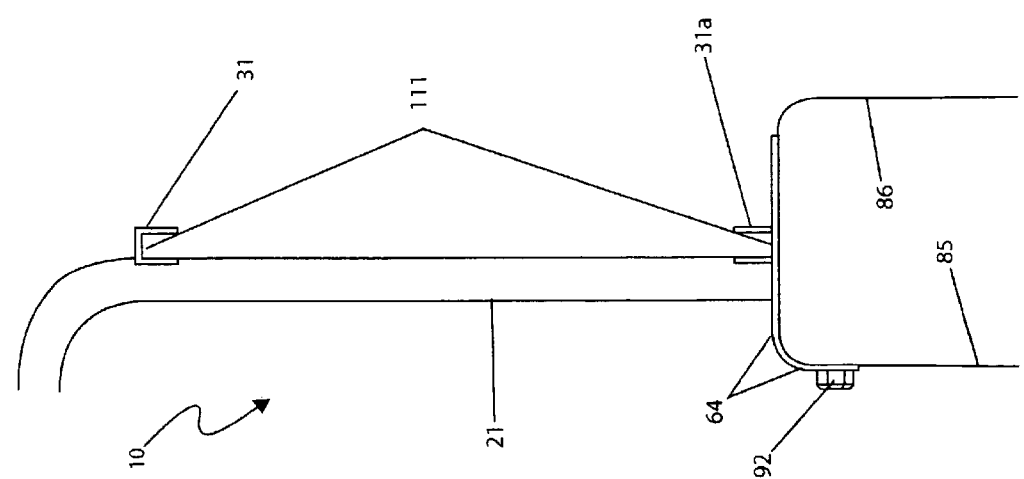
FIG. 11 is a rear view of a curbside 86 bed wall of the truck 15 depicting an exterior track configuration, according to a preferred embodiment of the present invention.

Referring now to FIG. 11, a rear view of a curbside 86 bed wall of the truck 15 depicting an exterior track configuration, according to the preferred embodiment of the present invention, is disclosed. In this embodiment, the first bottom track 31 and fixed lower track 31a are mounted externally 111. Said tracks 31, 31a are comprised of conventional "U"-shaped channels. By way of a non-limiting example, the tracks 31, 31a may be constructed as a weldment of square steel shapes (flat bar stock). Said tracks 31, 31a may be attached to the frame 21 using any method known in the art such as, but not limited to: welding, fasteners, adhesive, or the like. FIG. 11 depicts a rear view of the right hand (curbside) bed wall of the truck 15. Each track 31, 31a is open at both ends to permit panel 24, 25, 33 insertions (also see FIG. 2) and removal. The brackets 26, 27, 28 are used to enclose the ends. A single bracket 26, 27, 28 and tracks 31, 31a is configured to contain or retain a single shell component panel 24, 25, 33 around its entire perimeter. Each bracket 26, 27, 28 and track 24, 25, 33 comprise a movable bracket 26, 27, 28 that is hinged or otherwise removable to permit panels 24, 25, 33 to be inserted or removed. The brackets 26, 27, 28 and tracks 31, 31a may be mounted to the frame 21 in several configurations as illustrated herein below.

Figure 12:
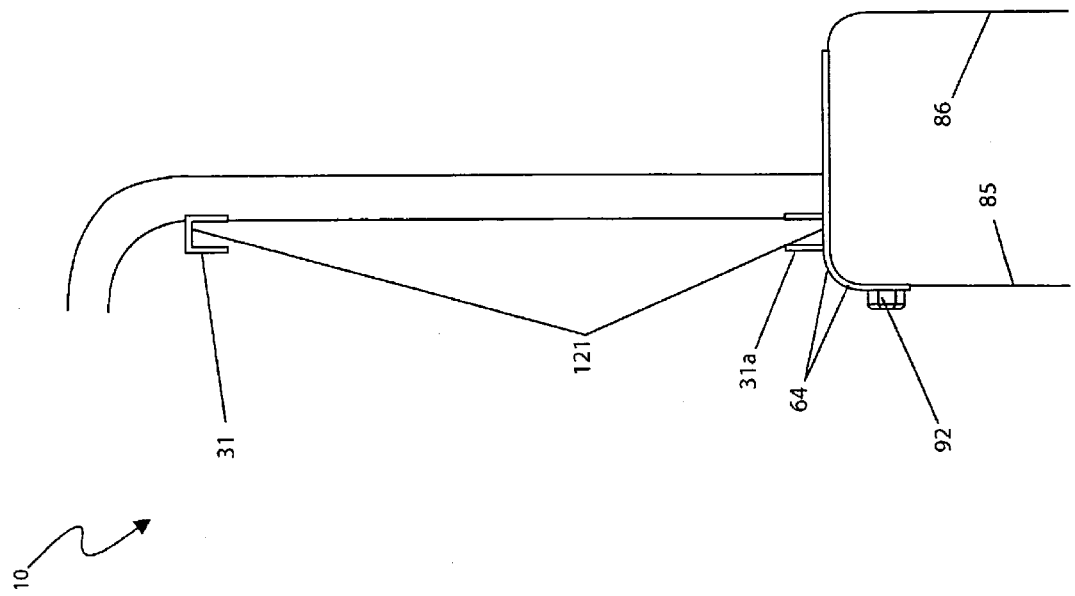
FIG. 12 is a rear view of a curbside 86 bed wall of the truck 15 depicting an interior 121 track configuration, according to a preferred embodiment of the present invention.
Figure 14:
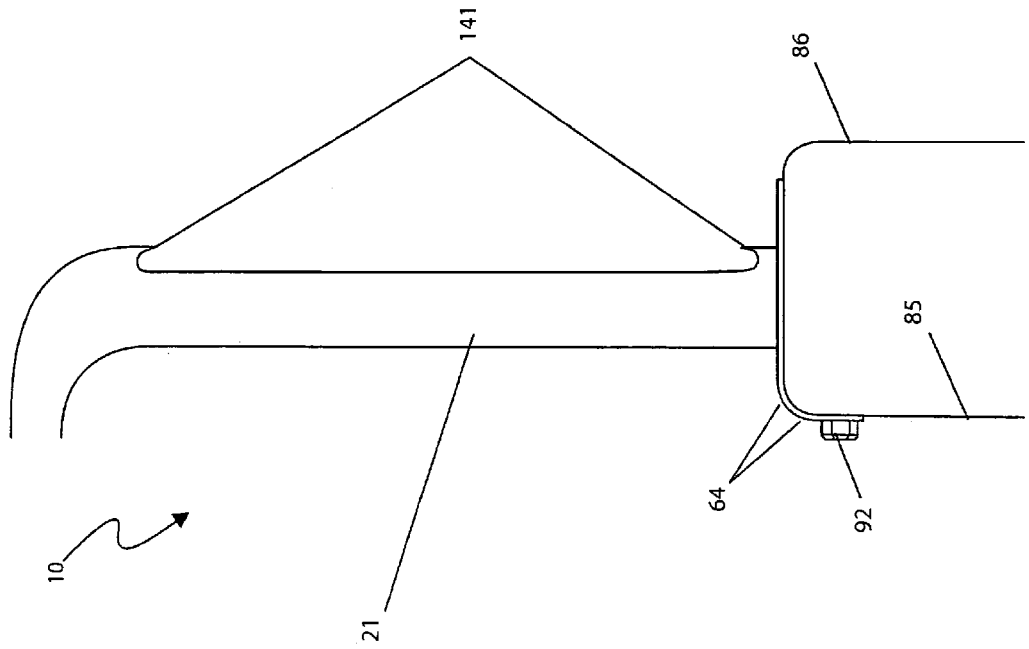
FIG. 14 is rear view of a curbside 86 bed wall of the truck 15 depicting a flush 141 track configuration, according to a preferred embodiment of the present invention.
Figure 13:
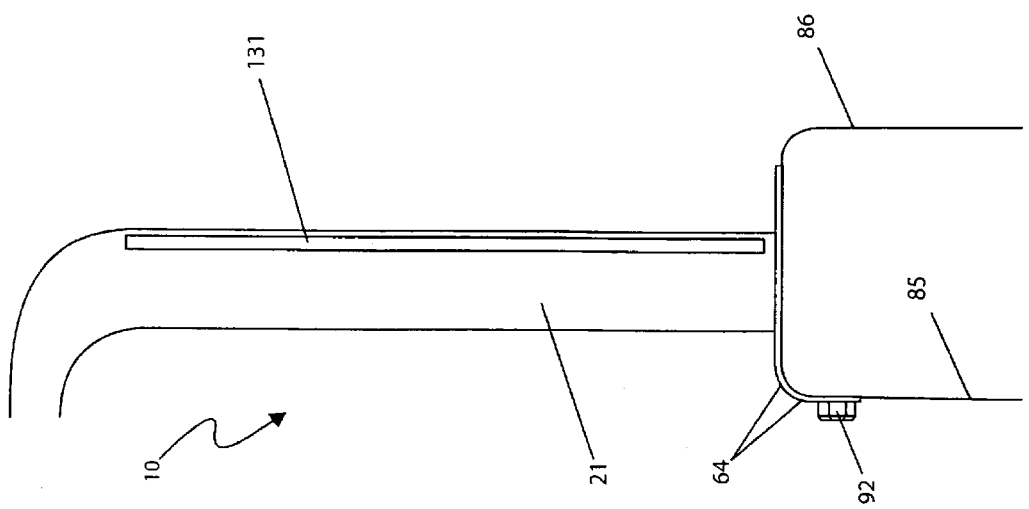
FIG. 13 is rear view of a curbside 86 bed wall of the truck 15 depicting an internal 131 track configuration, according to a preferred embodiment of the present invention.

Referring now to FIGS. 12 through 14, rear views of various track configurations, according to the preferred embodiment of the present invention, are disclosed. FIG. 12 depicts an interior track configuration, FIG. 13 depicts an internal track configuration, and FIG. 14 depicts a flush track configuration. Each bracket 26, 27, 28 is a "U"-shaped channel with a cap at both ends. Attaching the brackets 26, 27, 28 is accomplished via devices such as, but not limited to: welding, fasteners (such as rivets, screws, bolts, and the like), adhesives, or any other means known in the art. Note that in some configurations (e.g. internal 131 or flush 141) the frame itself 21 has been altered to accommodate the tracks 31, 31a and such embodiments are within the scope of the present invention.

Each of the moveable brackets 27, 28 may be attached to the frame 21 by one more conventional hinging devices. For example, FIG. 2 illustrates a rear bracket 27 attached by a hinge to a side panel track 35, and a front bracket 28 attached by a hinge to a front panel track 34. When in the open position illustrated in FIG. 2, the front bracket 28 allows the forward panel 24 to be inserted into and slid along the front tracks 32 and 34 in the direction indicated by arrow "A". Further, when the front bracket 28 is in the open position, the forward panel 24 may be slid along the tracks 32 and 34 (in the opposition direction identified by the arrow "A") and removed therefrom. When in the closed position illustrated in FIG. 3, the front bracket 28 retains the forward panel 24 in the front tracks 32 and 34. The other movable brackets (e.g., movable bracket 27) may operate in substantially the same manner as the bracket 28.

Figure 15:
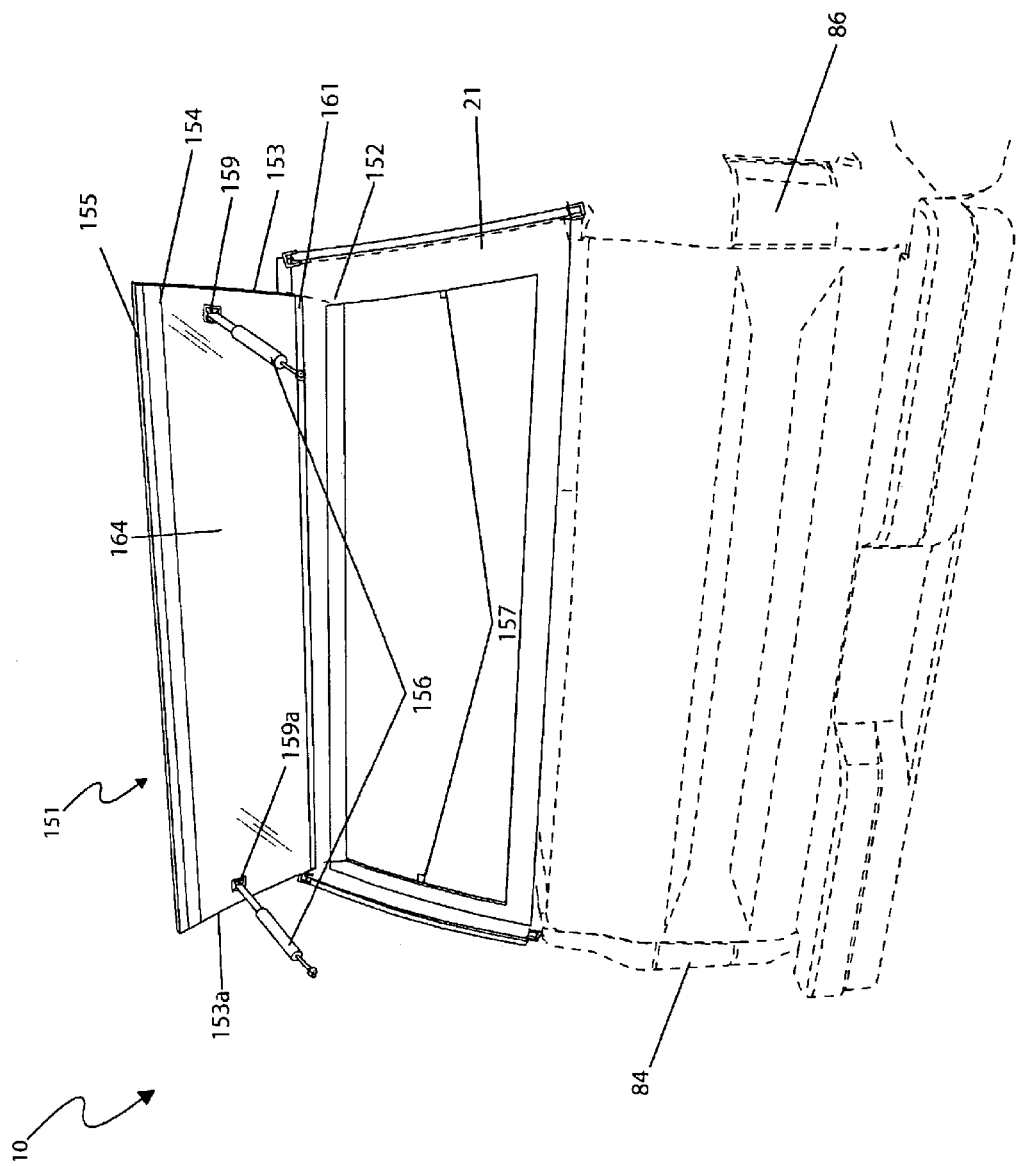
FIG. 15 is a partial isometric view of a rear window assembly 151, according to a preferred embodiment of the present invention.

Referring now to FIG. 15, a partial isometric view of a rear window assembly 151, according to a preferred embodiment of the present invention, is disclosed. Said FIG. 15 depicts an embodiment of a rear window assembly 151 that includes a glass rear window 164. Note that other embodiments may be constructed that which omit a window 164 such as, but not limited to: utilizing a solid panel could be utilized if the truck 15 owner prefers to obscure the payload from view without limiting the functions of the system 10. Constructing the rear window assembly 151 involves attaching a first side bracket 153, a second side bracket 153a, a bottom bracket 154, and a top bracket 161 to the rear window 164 and one track 152 to the frame 21. The brackets 153, 153a, 154, 161 fully enclose the window 164 similar to a picture frame, providing structure and support for the glass. The top bracket 161 slides into the track 152 laterally (also see FIG. 16). When the assembly 151 is removed, the track 152 remains attached to the frame 21, thereby enabling full use of the bed of the truck 15, its tailgate, and its payload when the rear window assembly 151 is removed or when the rear window assembly 151 is pivoted upward and into an open position. The bottom bracket 154 that forms the bottom edge of the window 164 would contain a provision for a standard rubber strip 155 for weatherproofing as found on standalone camper shells today, as well as standard locking mechanisms to secure the window 164 to the tailgate (Note: this locking mechanism is separate from the locks attached to the moveable brackets 27, 28 that secure the panels 24, 25, 33 in place). The vertical brackets 153, 153a for the rear window assembly 151 include a first piston mount point 159 and a second piston mount point 159a, thereby providing a position for a pair of standard hydraulic pistons 156. Said hydraulic pistons 156 are utilized thereto assist lifting the rear window panel 164 to an open position. The other end of the pistons 156 mount onto the frame 21 at the frame mount points 157.

Figure 16:
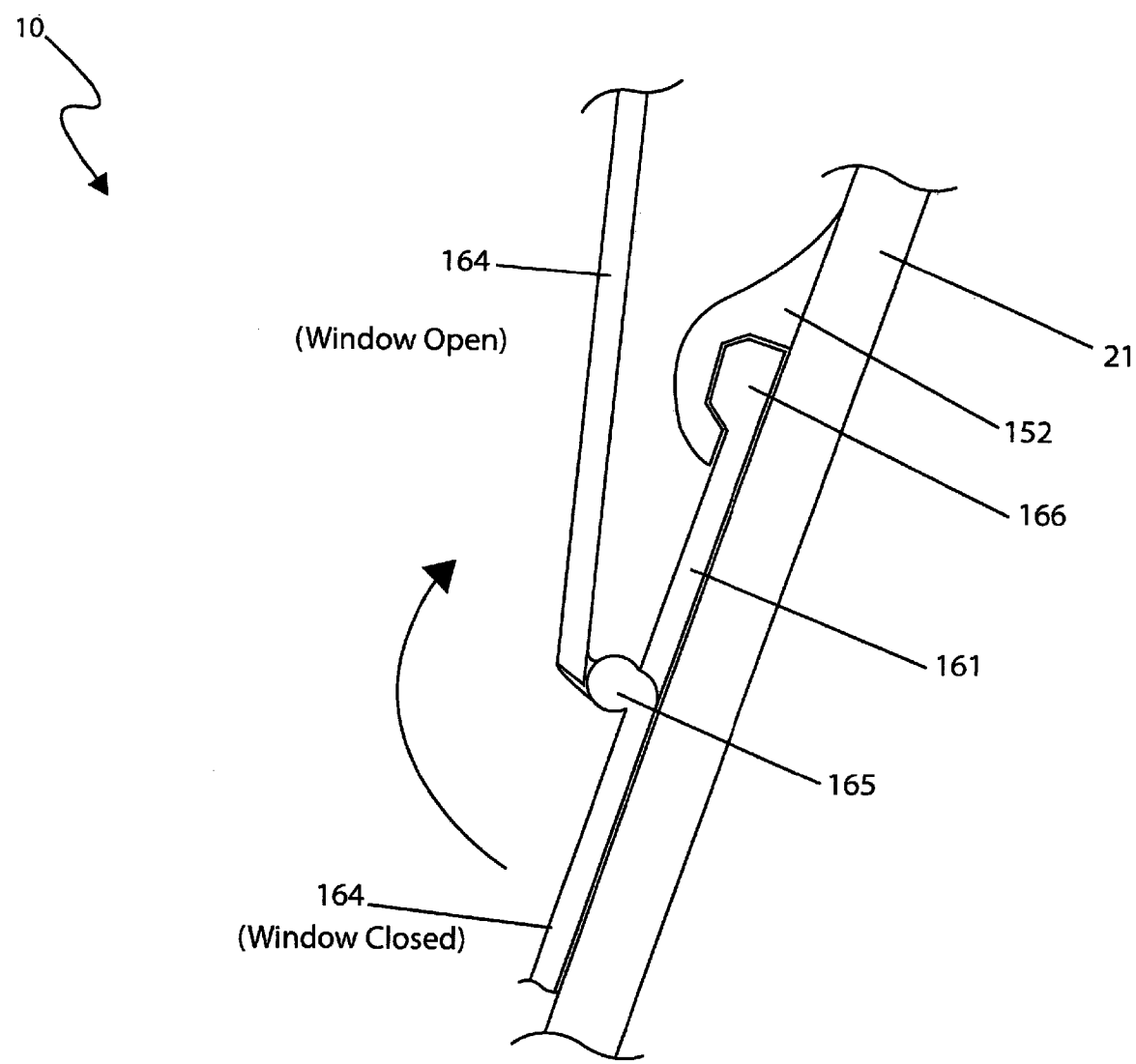
FIG. 16 is a side view of the rear window assembly 151, according to a preferred embodiment of the present invention.

Referring now to FIG. 16, a side view of the rear window assembly 151, according to a preferred embodiment of the present invention, is disclosed. Said FIG. 16 depicts a detailed curb side view of the track 152 used to mount the rear window assembly 151 to the frame 21. The location of the track 152 on the frame 21 is abovementioned therein FIG. 15. A top bracket 161 comprises an interlocking piece thereto receive the inside the track 152. The bracket 161 includes an attached top bracket hinge 165. Said top bracket hinge 165 is attached to the top bracket 161 and may be utilized to open the rear window 164. The interlocking piece 166 of the top bracket 161 is inserted into the track 152 by sliding the interlocking piece 166 horizontally into said track 152. The track 152 comprises an end cap on the road side. The locking mechanisms used to lock the rear window assembly 151 therein the track 152 are similar to the other locking mechanisms used to other panels 24, 25, 33 within their respective tracks 31, 31a, 32, 34, 35 explained below. In each of the locking mechanisms described below, a lock forms an end cap, which may be located on the end of the curb side of the track 152.

Figure 17:
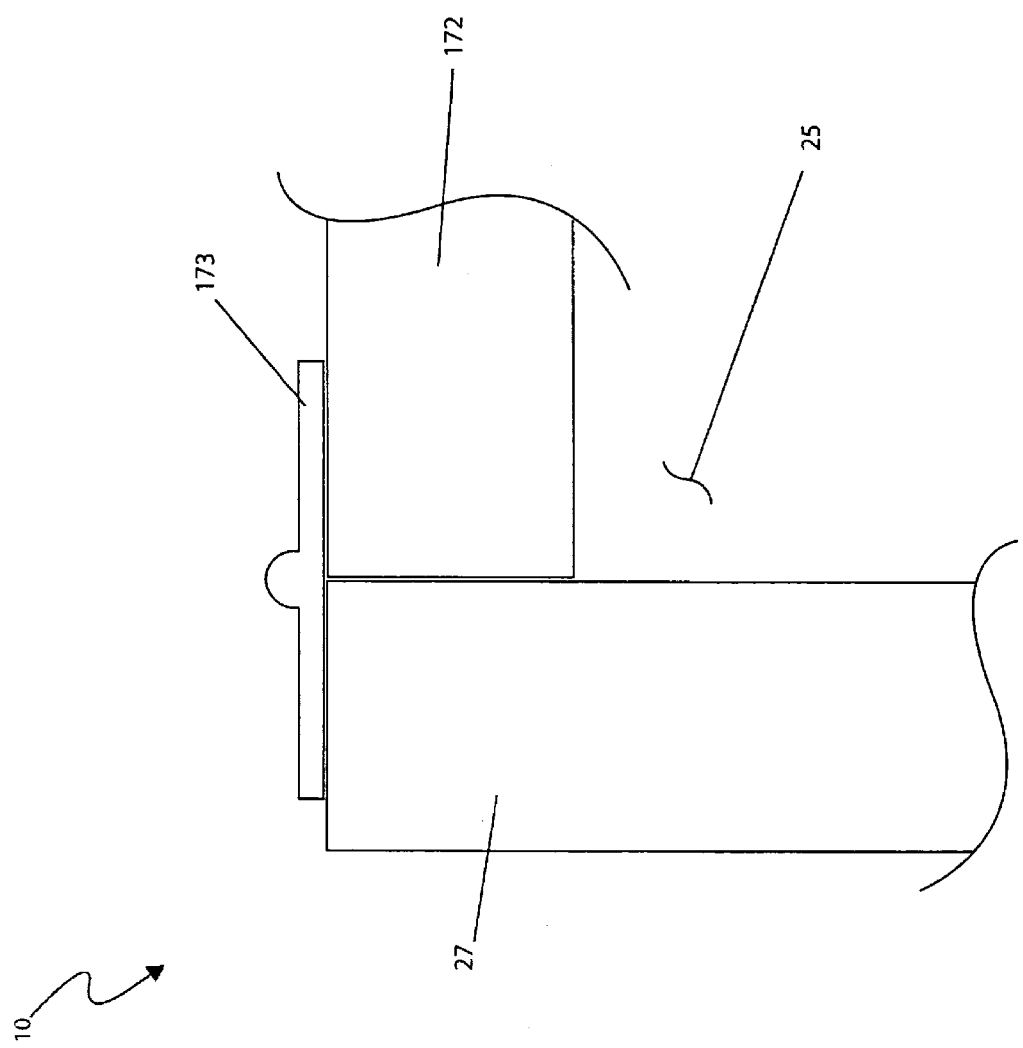
FIG. 17 is a side view of a movable bracket 27 utilized therewith a side panel 25, according to a preferred embodiment of the present invention.

Referring now to FIG. 17, a side view of a movable bracket 27 utilized therewith a side panel 25, according to the preferred embodiment of the present invention, is disclosed. FIG. 17 clearly depicts a side view of the rear movable bracket 27 mounted to the fixed track 172 by the hinge 173.

Figure 18:
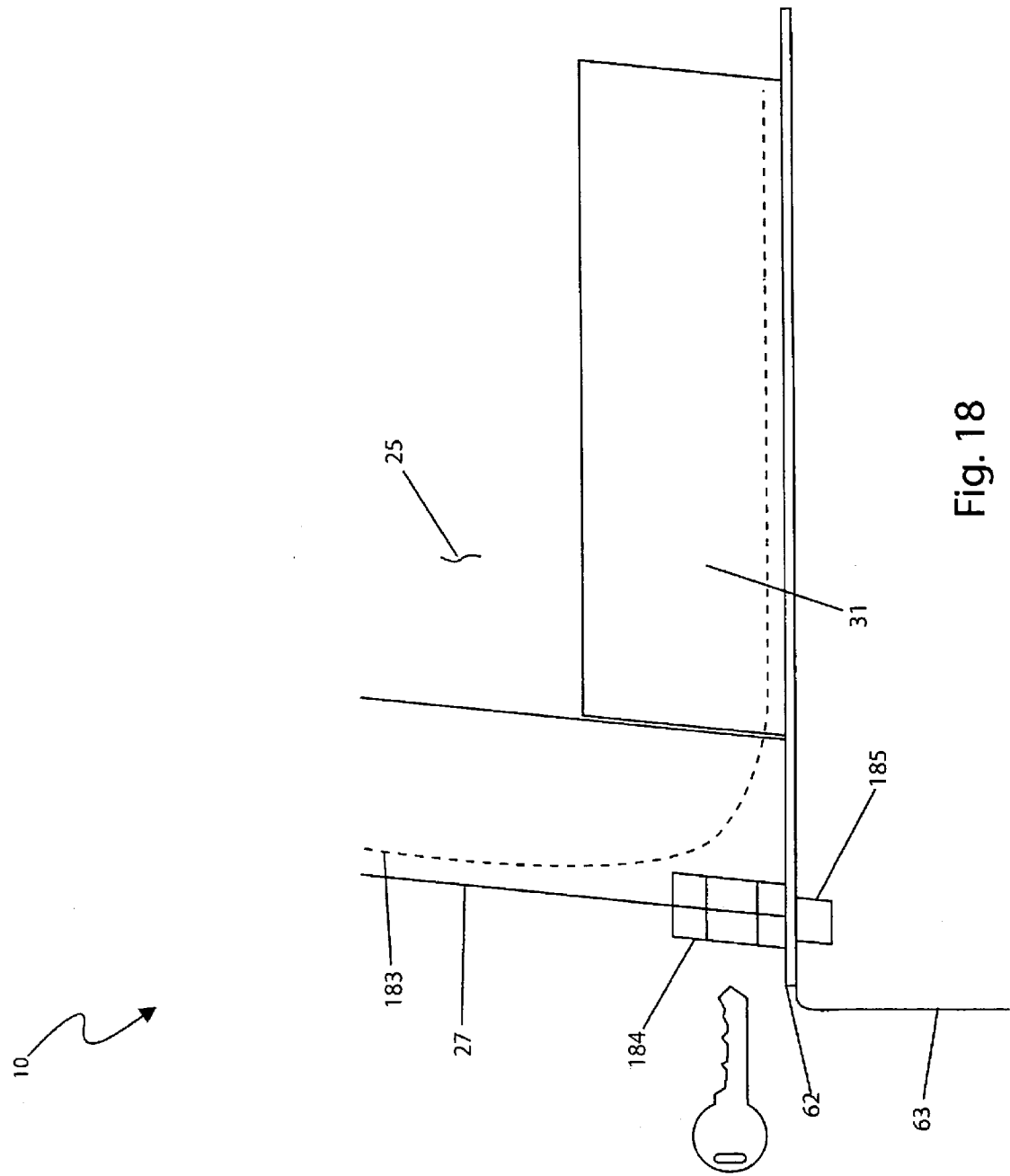
FIG. 18 is a side view of the movable bracket 27 depicting a locked configuration, according to a preferred embodiment of the present invention.

Referring now to FIG. 18, a side view of the movable bracket 27 depicting a locked configuration, according to the preferred embodiment of the present invention, is disclosed. FIG. 18 depicts how the hinged movable bracket 27 and abovementioned track assembly can be locked into place. The locking mechanism is shown for the side panel 25 at a rear truck edge 63. The hinged movable bracket 27 can be opened (i.e., placed in the open position illustrated in FIG. 2) to allow for the insertion of the side panel 25 into the first bottom track 31 and side panel top track 35. When the hinged movable bracket 27 is in the closed position, it seals against the bottom first track 31 and the side panel top track 35. While in the closed position, the bracket 27 can be secured in place by a lock 184 configured to deploy a bolt 185 into the mounting plate 62 or truck bed side walls. Each abovementioned bracket 26, 27, 28 has its own lock 184 to permit any configuration of panels 24, 25, 33 to be locked into place individually. The lock 184 may be constructed using any standard lock known in the art such as, but not limited to: devices which utilize a manual key with pins and tumblers, a lock configured to provide electronic keyless entry, or the like. The bracket 27 is illustrated attached to side panel top track 35 by a hinge 173 that allows the rear moveable bracket 27 to swing up and out of the way so that the side panel 25 can be inserted into or removed from the top track 35. The hinge 173 may be permanently affixed on the rear movable bracket 27 and the fixed top track 35 to prevent tampering or removal by other persons and may be comprised of a conventional hinging device known in the art. The hinge 173 may be permanently affixed to the rear movable bracket 27 by welding, fasteners, bolts, rivets, adhesives, or other suitable means known in the art.

Figure 19:
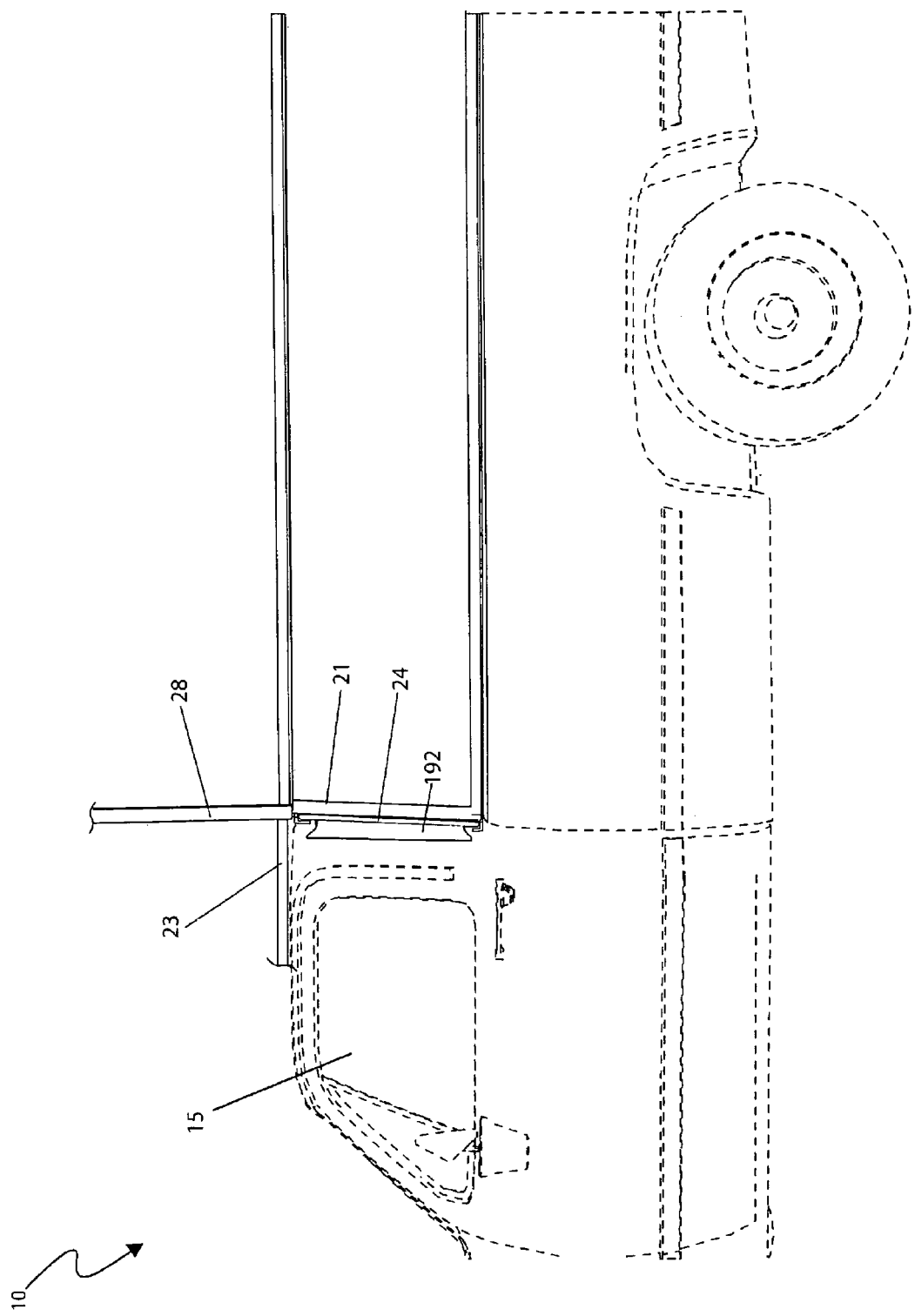
FIG. 19 is a side view of a forward panel 24, according to a preferred embodiment of the present invention.

Referring now to FIG. 19, a side view of a forward panel 24, according to the preferred embodiment of the present invention, is disclosed. In this embodiment, the forward panel 24 has an optional boot 192 that creates a weather proof seal between the cab and the camper shell. The bracket 27, 28 and tracks 31, 35 for the side panel 25 have been omitted for illustration purposes only. External mounting of the forward bracket 24 and track 31, 35 thereto the frame 21 allows for the ready insertion of the panel 24 that utilizes the boot 192. In this view, the bracket 28 is shown in the open position to provide visibility of the forward panel 24. When the bracket 28 is in the closed position, the forward panel 24 may be obscured but the boot 192 may remain visible. This view also shows the optional cargo carrying rack 23.

Referring now to FIG. 20, a side view of the side panel 25 depicting placement of weather-stripping 201, according to the preferred embodiment of the present invention, is disclosed. Each panel 24, 25, 33 may include weather-stripping 201 insets along its entire perimeter to enable a good seal with the tracks 31, 31*a*, 32, 34, 35 and brackets 27, 28. In the embodiment depicted, the weather-stripping 201 is inset along one of the faces of the panel 25 rather than its edges. With respect to the weather-stripping 201, the front and back faces are equivalent. In this manner, when a panel 25 is slid into place, its weight will not be loaded on top of the weather-stripping 201, thereby increasing the useful life of said weather-stripping 201. Alternatively, the weather-stripping 201 may be placed inside each track 31, 31*a*, 32, 34, 35 and bracket 27, 28 in a location adjacent to and along one of the faces of the panels 24, 25, 33 (and not along the bottom edge of the panels 24, 25, 33). To ease the job of sliding a panel 25 into place, a plurality of conventional rollers 202 may be placed inside the edges of the panels 25, similar to those found on the bottom of screen and sliding glass doors. This may be particularly useful for use with panels 25 constructed from heavier materials, such as steel.

Referring now to FIG. 21, a rear view of an external, inverse bracket mount configuration, according to the preferred embodiment of the present invention, is disclosed. This alternate embodiment comprises a pair of alternate tracks 231, a plurality of shell panels 232, an alternate top panel 233, and an interlocking connector 237. The alternate tracks 231 are inverted and externally mounted to the frame 21, thereby permitting the shell panel 232 to fully wrap around and enclose them. The alternate top panel 233 is also shown, along with an interlocking connector portion 237, thereby allowing the panels 233 to interlock to create a seamless appearance. This approach allows the panels 233 to completely obscure the frame 21, brackets 27, 28, and tracks 31, 31*a*, 34, 35 for a flusher, integrated appearance. The perspective is a rear view, with the outside edge of the bed wall 84 on the left, and the bed side 85 on the right. This approach still permits the bottom edge of the lower track 31*a* to run the length of the truck bed to allow for a continuous seam of weather-stripping 201 for the entire perimeter of the truck bed. The track 31*a* is similar in purpose to the previous bottom track 31, with the notable difference that this design obscures the track 31*a* from view. The track 31*a* still serves the purpose of permitting a panel 233 to be slid into place and removed from the brackets 27, 28 and track assembly. This design still permits the use of a cargo rack 23 if desired. Cutouts (not shown) may be formed in one or more of the interlocking panels to permit a cargo rack 23 to be affixed to the top portion of the frame 21 if desired. The design of the system 10 allows for this flexibility.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIGS. 1 through 21.

The method of installing and utilizing the system 10 may be achieved by performing the following steps: acquiring the system 10; form-fitting the system 10 to the truck 15 so said system 10 does not extend beyond the dimensions of the truck 15; installing the frame 21 thereto corresponding mount points 52, 53 thereon the truck 15, as intended by the truck manufacturer; utilizing the frame 21 as is and installing the cargo rack 23 as desired; installing the panels 24, 25, 33 thereto create the shell of the system 10 as desired; sliding said panels 24, 25, 33 thereon a corresponding track 31, 31*a*, 34, 35 and positioning the brackets 27, 28 downwardly in a locked position; removing the top panel 33 for transporting tall loads; removing and storing the panels 24, 25, 33 on edge and stacked in a compressed manner as desired; and, utilizing the system 10 thereto carry cargo therein the bed portion of a truck or thereon the cargo rack 23.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A component camper shell system for use on a bed portion of a truck, said component camper shell system comprising:
   a frame adapted to be mounted to the truck bed portion;
   a forward panel, a pair of side panels, and a top panel independently and removably affixed to said frame; and,
   a rear window assembly pivotally mounted to said frame and oppositely spaced from said forward panel;
   wherein said frame comprises:
      a plurality of tracks contiguously formed along a perimeter thereof, and,
      a plurality of moveable brackets connected to said tracks;
   wherein each of said forward, side and top panels linearly slide along said tracks respectively and are secured to said frame by said moveable brackets respectively.

2. The component camper shell system of claim 1, wherein said frame further comprises:

a plurality of mounting plates adapted to be positioned along a wall of the truck bed portion; and, a plurality of pegs adapted to be positioned on the wall of the truck bed portion;

wherein said pegs are attached to said mounting plates and the wall of the truck bed portion for stabilizing said frame above said truck bed portion.

3. The component camper shell system of claim 1, wherein a first bottom one of said tracks comprises: an outer bracket edge and an inner bracket edge adapted to be placed flush against a road side edge of said frame;

wherein said first bottom track and a fixed lower one of said tracks are each mounted externally to said frame, each of said first bottom track and said fixed lower track have "U"-shaped channels.

4. The component camper shell system of claim 1, wherein each of said moveable brackets is pivotally attached to a corresponding one of said tracks and thereby permit said panels to linearly slide along said tracks when said moveable brackets are biased to an open position respectively.

5. The component camper shell system of claim 1, wherein said rear window assembly comprises:

a window;

first and second side brackets; and, bottom and top brackets;

wherein each of said first, second, bottom and top brackets are connected to a corresponding edge of said window respectively;

wherein said top bracket laterally slides into one of said tracks and thereby shields a rear side of said frame from ambient weather; and, wherein said one track remains attached to said frame as said rear window assembly is pivoted upward and into an open position.

6. The component camper shell system of claim 5, wherein said top bracket is provided with an interlocking piece received by said one track, said top bracket further including a hinge attached to said window and thereby permits said window to pivot exterior of said frame when biased between open and closed positions;

wherein each of said movable brackets are hingedly affixed to fixed ones of said tracks such that said forward, side and top panels are freely inserted along said fixed tracks when said movable brackets are biased to an open position respectively.

7. The component camper shell system of claim 1, further comprising: a lock coupled to at least one of said movable brackets and a corresponding one of said mounting plates to prevent said a corresponding one of said panels from prematurely sliding out from said fixed tracks;

wherein said forward panel has a boot adapted to create a weather proof seal between a cab portion of the truck and said camper shell.

8. The component camper shell system of claim 1, further comprising: a plurality of rollers located along an edge of said panels respectively for aiding in linear displacement of said panels along said tracks respectively.

9. The component camper shell system of claim 1, further comprising:

a plurality of interlocking connector portions formed at abutting ends of said top panel and a conjoining one of said panels respectively;

said tracks being inverted and externally mounted to said frame and configured in such a manner that said top and conjoining panels fully wrap around said tracks when said interlocking connector portions are mated together.

10. A component camper shell system for use on a bed portion of a truck, said component camper shell system comprising:

a frame adapted to be mounted to the truck bed portion;

a forward panel, a pair of side panels, and a top panel independently and removably affixed to said frame;

a rear window assembly pivotally mounted to said frame and oppositely spaced from said forward panel;

wherein said frame comprises:

a plurality of tracks contiguously formed along a perimeter thereof, and, a plurality of moveable brackets connected to said tracks;

wherein each of said forward, side and top panels linearly slide along said tracks respectively and are secured to said frame by said moveable brackets respectively; and, a cargo rack system removably attached to a roof of said frame.

11. The component camper shell system of claim 10, wherein said frame further comprises:

a plurality of mounting plates adapted to be positioned along a wall of the truck bed portion; and, a plurality of pegs adapted to be positioned on the wall of the truck bed portion;

wherein said pegs are attached to said mounting plates and the wall of the truck bed portion for stabilizing said frame above said truck bed portion.

12. The component camper shell system of claim 10, wherein a first bottom one of said tracks comprises: an outer bracket edge and an inner bracket edge adapted to be placed flush against a road side edge of said frame;

wherein said first bottom track and a fixed lower one of said tracks are each mounted externally to said frame, each of said first bottom track and said fixed lower track have "U"-shaped channels.

13. The component camper shell system of claim 10, wherein each of said moveable brackets is pivotally attached to a corresponding one of said tracks and thereby permit said panels to linearly slide along said tracks when said moveable brackets are biased to an open position respectively.

14. The component camper shell system of claim 10, wherein said rear window assembly comprises:

a window;

first and second side brackets; and, bottom and top brackets;

wherein each of said first, second, bottom and top brackets are connected to a corresponding edge of said window respectively;

wherein said top bracket laterally slides into one of said tracks and thereby shields a rear side of said frame from ambient weather; and, wherein said one track remains attached to said frame as said rear window assembly is pivoted upward and into an open position.

15. The component camper shell system of claim 14, wherein said top bracket is provided with an interlocking piece received by said one track, said top bracket further including a hinge attached to said window and thereby permits said window to pivot exterior of said frame when biased between open and closed positions;

wherein each of said movable brackets are hingedly affixed to fixed ones of said tracks such that said forward, side and top panels are freely inserted along said fixed tracks when said movable brackets are biased to an open position respectively.

16. The component camper shell system of claim 10, further comprising: a lock coupled to at least one of said movable brackets and a corresponding one of said mounting plates to prevent said a corresponding one of said panels from prematurely sliding out from said fixed tracks;

wherein said forward panel has a boot adapted to create a weather proof seal between a cab portion of the truck and said camper shell.

17. The component camper shell system of claim 10, further comprising: a plurality of rollers located along an edge of said panels respectively for aiding in linear displacement of said panels along said tracks respectively.

18. The component camper shell system of claim 10, further comprising:

a plurality of interlocking connector portions formed at abutting ends of said top panel and a conjoining one of said panels respectively;

said tracks being inverted and externally mounted to said frame and configured in such a manner that said top and conjoining panels fully wrap around said tracks when said interlocking connector portions are mated together.

19. The method of installing and utilizing acquiring a component camper shell system, said component camper shell system including a frame adapted to be mounted to the truck bed portion; a forward panel, a pair of side panels, and a top panel independently and removably affixed to said frame, and a rear window assembly pivotally mounted to said frame and oppositely spaced from said forward panel, wherein said frame comprises a plurality of tracks contiguously formed along a perimeter thereof, a plurality of moveable brackets connected to said tracks, and a cargo rack system removably attached to a roof of said frame, wherein each of said forward side and top panels linearly slide along said tracks respectively and are secured to said frame by said moveable brackets respectively, said method comprising the steps of:

form-fitting said component camper shell system to the truck so said component camper shell system does not extend beyond outer dimensions of the truck;

installing the frame to corresponding mount points on the truck;

installing the panels to create a shell portion of the component camper shell system by sliding each of said panels a corresponding track and thereafter positioning the moveable brackets downwardly in a locked position; and, installing the cargo rack as desired by the user.

* * * * *